US009266993B2

(12) United States Patent
Stentrup et al.

(10) Patent No.: US 9,266,993 B2
(45) Date of Patent: Feb. 23, 2016

(54) COATING COMPOSITION, METHOD FOR THE PRODUCTION THEREOF, USE THEREOF, AND SUBSTRATES COATED THEREWITH

(75) Inventors: Manuela Stentrup, Ascheberg (DE);
Bernd Richter, Munster (DE);
Heinz-Peter Rink, Munster (DE)

(73) Assignee: BASF Coatings GmbH, Munster (DE)

( * ) Notice: Subject to any disclaimer, the term of this patent is extended or adjusted under 35 U.S.C. 154(b) by 0 days.

(21) Appl. No.: 12/933,287

(22) PCT Filed: Mar. 17, 2009

(86) PCT No.: PCT/EP2009/001956
§ 371 (c)(1),
(2), (4) Date: Sep. 17, 2010

(87) PCT Pub. No.: WO2009/115294
PCT Pub. Date: Sep. 24, 2009

(65) Prior Publication Data
US 2011/0020659 A1  Jan. 27, 2011

(30) Foreign Application Priority Data
Mar. 19, 2008 (DE) .......................... 10 2008 015 104

(51) Int. Cl.
*C08K 3/32* (2006.01)
*C08G 18/32* (2006.01)
*C08G 18/28* (2006.01)
*C08G 18/42* (2006.01)
*C08G 18/79* (2006.01)
*C08K 3/00* (2006.01)

(52) U.S. Cl.
CPC .......... *C08G 18/3256* (2013.01); *C08G 18/289* (2013.01); *C08G 18/4244* (2013.01); *C08G 18/792* (2013.01); *C08K 3/0033* (2013.01); *C08K 3/32* (2013.01); *C08G 2150/90* (2013.01); *Y10T 428/31678* (2015.04)

(58) Field of Classification Search
CPC ............. C08G 18/3256; C08G 18/289; C08G 18/4244; C08G 18/792; C08K 3/0033; C08K 3/32
USPC ........................................................ 524/236
See application file for complete search history.

(56) References Cited

U.S. PATENT DOCUMENTS

| 4,294,808 | A | * | 10/1981 | Wasel-Nielen et al. ....... 423/305 |
| 4,337,092 | A | | 6/1982 | Hestermann et al. |
| 5,214,086 | A | | 5/1993 | Mormile et al. |
| 5,665,149 | A | | 9/1997 | Gotzmann et al. |
| 5,977,246 | A | | 11/1999 | Fenn |
| 6,297,320 | B1 | * | 10/2001 | Tang et al. .................... 525/107 |
| 6,359,059 | B1 | | 3/2002 | Shepler et al. |
| 2004/0096569 | A1 | | 5/2004 | Barkalow et al. |
| 2006/0047085 | A1 | | 3/2006 | Trivedi |
| 2006/0198951 | A1 | * | 9/2006 | Tang et al. .................... 427/140 |
| 2007/0129527 | A1 | | 6/2007 | Griswold |
| 2008/0223256 | A1 | * | 9/2008 | Laumann et al. ............. 106/431 |
| 2009/0291220 | A1 | | 11/2009 | Rademacher et al. |

FOREIGN PATENT DOCUMENTS

| DE | 69702047 T2 | 10/2000 |
| DE | 102005036630 B3 | 9/2006 |
| DE | 102006044035 A1 | 3/2008 |
| EP | 0008127 A1 | 2/1980 |
| EP | 0009175 A1 | 4/1980 |
| EP | 0028290 A1 | 5/1981 |
| EP | 0249201 A2 | 12/1987 |
| EP | 0276501 A2 | 8/1988 |
| EP | 0296540 A2 | 12/1988 |
| EP | 0686654 A1 | 12/1995 |
| EP | 0893458 A1 | 1/1999 |
| WO | WO9201023 A1 | 1/1992 |
| WO | WO97/12945 A1 | 4/1997 |

OTHER PUBLICATIONS

ISO 2409 Abstract. 2007.*
International Search Report for International application No. PCT/EP2009/001956 dated Jul. 13, 2009.
Written Opinion for International application No. PCT/EP2009/001956 dated Jul. 13, 2009.
International Preliminary Report on Patentability for International application No. PCT/EP2009/001956 dated Oct. 5, 2010.
Bayer MaterialScience, 2006, "Desmophen 650A 65", p. 1-2.
Bayer MaterialScience, 2011, "Desmophen 650 MPA", p. 1-3.
Co-Pending U.S. Appl. No. 12/441,253, filed Mar. 13, 2009.
International Search Report for International Application No. PCT/EP2007/008003 mailed Jan. 28, 2008.
English translation of Written Opinion for International Application No. PCT/EP2007/008003 originally mailed Jan. 28, 2008.
English translation of International Preliminary Report on Patentability for International Application No. PCT/EP2007/008003 mailed Apr. 16, 2009.
Becker et al., Derwent Abstract of EP 0296540 A2, 1993.
Kalenda et al., "Properties of anticorrosion pigments depending on their chemical composition and PVC value", Pigment & Resin Technology, 2006, vol. 35, No. 4, p. 188-199.

* cited by examiner

*Primary Examiner* — John Uselding
(74) *Attorney, Agent, or Firm* — Servilla Whitney LLC

(57) ABSTRACT

The present invention relates to coating compositions comprising at least one isocyanate compound, at least one hydroxyl-containing compound, at least one aldimine and/or ketimine, one or more fillers, one or more pigments, at least one solvent, and, optionally, one or more additives. The invention also relates to processes for preparing these coating compositions, and to their use as coating material in the automotive refinish segment, in the vehicle, utility vehicle (including skips, chassis), and agricultural-machinery and rail segments, and in machines. Preferably, the coating compositions of the invention are used as primers with and without chemical pretreatment such as iron or zinc phosphating, with and without mechanical pretreatment such as sandblasting, abrading or the like.

9 Claims, No Drawings

COATING COMPOSITION, METHOD FOR THE PRODUCTION THEREOF, USE THEREOF, AND SUBSTRATES COATED THEREWITH

CROSS REFERENCE TO RELATED APPLICATIONS

This application is a National Phase Application of Patent Application PCT/EP2009/001956 filed on 17 Mar. 2009, which claims priority to DE 10 2008 015 104.1, filed 19 Mar. 2008, both of which are hereby incorporated by reference in their entirety.

TECHNICAL FIELD

The present invention relates to coating compositions comprising at least one isocyanate compound, at least one hydroxyl-containing compound, at least one aldimine and/or ketimine, one or more fillers, one or more pigments, at least one solvent, and, optionally, one or more additives. The invention also relates to processes for preparing these coating compositions, and to their use as coating material in the automotive refinish segment, in the vehicle, utility vehicle (including skips, chassis), and agricultural-machinery and rail segments, and in machines. Preferably the coating compositions of the invention are used as primers with and without chemical pretreatment such as iron or zinc phosphating, with and without mechanical pretreatment such as sandblasting, abrading or the like.

BACKGROUND OF THE INVENTION

Coating compositions, more particularly polyurethane coatings produced by reacting isocyanate resins with polyol resins, are well known. Such coatings are known to feature a range of outstanding properties, including high durability and chemical stability. Their glamour properties make them outstandingly suitable for automotive refinish, utility-vehicle and automobile-repair applications, and also for industrial applications. In comparison to aqueous compositions, they feature substantially better drying times and improved corrosion protection. With these coatings, however, the polyol, owing to the formation of hydrogen bonds and owing to the molecular weight of the main polymer chain, makes the greatest contribution to the overall viscosity of the coating, thereby limiting the freedom to incorporate other substances at the formulation stage and to meet the specifications relating to the application solids content. The reduction of the molecular weight of the polyol leads ultimately to slow network development, unless considerable quantities of energy are introduced.

Although it is possible by using more solvents to reduce the overall viscosity of the coating and so to accelerate the development of a network, the use of large quantities of solvents is environmentally objectionable. More particularly, coating compositions with high fractions of volatile organic compounds (VOCs), more particularly solvents, fail to match the provisions of directives which lay down a maximum VOC content. In the future it will be necessary to realize very low solvent contents or VOC contents, of not more than 280 g/l.

The properties of high-solids, polyol-containing polyurethane coatings can also be improved through the use of reactive diluents. One application of this technique has been shown by U.S. Pat. No. 5,214,086. It describes the use of oligoaldimines, oligoketimines, and hindered oligoamines for modifying polyol compositions, this modification leading in total to a reduction in the viscosities of the mixtures together with the maintenance, and often improvement, of the development of a network, and of the physical properties. On aluminum and on multimaterial substrates, however, the substrate being either in the exposed state or in the unexposed state, the adhesion of these coating compositions is unsatisfactory.

Adhesion to aluminum is typically obtained in another way, through the use of chromate-containing fillers (Lückert, Pigment+Füllstofftabellen, Lückert Verlag, ISBN 3-927342-03-3; Glasurithandbuch 1984, Vincentz Verlag, ISBN 3-87870-192-6; Peter Volk in "Metalloberfläche", special issue May 2006). On account of the environmental burden, however, the intention is that the desired properties should be achieved without the use of chromate.

It is an object of the invention, then, to develop high-solids coating compositions which comprise chromate-free fillers and pigments and which exhibit good adhesion to aluminum, steel and/or multimaterial substrates in both the exposed and the unexposed state. On weathering, the coating compositions ought to continue to exhibit good properties. Finally, they ought to exhibit properties such as the mediation of sufficient corrosion protection and satisfactory drying times. Depending on the field of use, the coatings must be abradable after drying or readily overcoatable, for wet-on-wet applications, with conventional and aqueous coating materials.

SUMMARY OF THE INVENTION

This object is achieved by means of a coating composition comprising 10% to 20% by weight of at least one isocyanate compound, 5% to 20% by weight of at least one hydroxyl-containing compound, 5% to 25% by weight of at least one aldimine and/or ketimine, 2.5%-60% by weight of one or more fillers, color pigments and anticorrosion pigments, calcium hydrogen phosphate being included in a mass fraction of 1.0%-20% by weight as the filler or as a filler, based in each case on the total weight of the coating composition, and at least one solvent,
wherein at least one silane compound of the general formula (I),

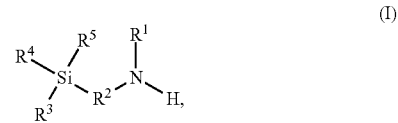

in which
$R^1$ is H; unsubstituted or at least monosubstituted alkyl; unsubstituted or at least monosubstituted heteroalkyl; unsubstituted or at least monosubstituted cycloalkyl or cycloalkenyl; unsubstituted or at least monosubstituted heterocycloalkyl or heterocycloalkenyl; unsubstituted or at least monosubstituted aryl; or unsubstituted or at least monosubstituted -(alkylene)-aryl or -(alkenylene)-aryl;
$R^2$ is unsubstituted or at least monosubstituted -(alkylene)-;
unsubstituted or at least monosubstituted -(heteroalkylene)-; unsubstituted or at least monosubstituted-(arylene)-; unsubstituted or at least monosubstituted -(alkylene)-(arylene)-; or unsubstituted or at least monosubstituted -(heteroalkylene)-(arylene)-;
$R^3$ is $-O-R^6$; $-C(=O)-R^7$; H; unsubstituted or substituted alkyl; unsubstituted or substituted heteroalkyl;

unsubstituted or at least monosubstituted aryl; or unsubstituted or at least monosubstituted -(alkylene)-aryl or -(alkenylene)-aryl;

$R^4$ is —O—$R^8$; —C(=O)—$R^9$; H; unsubstituted or substituted alkyl; unsubstituted or substituted heteroalkyl; unsubstituted or at least monosubstituted aryl; or unsubstituted or at least monosubstituted -(alkylene)-aryl or -(alkenylene)-aryl;

$R^5$ is —O—$R^{10}$; —C(=O)—$R^{11}$; H; unsubstituted or substituted alkyl; unsubstituted or substituted heteroalkyl; unsubstituted or at least monosubstituted aryl; or unsubstituted or at least monosubstituted -(alkylene)-aryl or -(alkenylene)-aryl; and $R^6$, $R^7$, $R^8$, $R^9$, $R^{10}$ and $R^{11}$, independently of one another, are each H; unsubstituted or substituted alkyl; or unsubstituted or substituted heteroalkyl;

is included in a mass fraction of 0.1% to 5.0% by weight, based on the total weight of the coating composition, the mass fractions of the stated constituents adding, together with the solvent, to 100% by weight.

The coating compositions of the invention generally comprise a solvent. Instead of the solvents, coating compositions of the invention may also comprise reactive diluents, which may likewise lead to a reduction in the viscosity.

DETAILED DESCRIPTION OF A PREFFERED EMBODIMENT OF THE INVENTION

These coating compositions adhere well or very well to aluminum, steel and/or multimaterial substrates, exhibit good properties on weathering, mediate good to very good corrosion protection, dry rapidly, and feature effective abradability.

The term "alkyl" for the purposes of the present invention encompasses acyclic saturated hydrocarbon radicals, which may be branched or straight-chain and also unsubstituted or at least monosubstituted, having, as in the case of $C_{1-12}$-alkyl, 1 to 12 (i.e., 1, 2, 3, 4, 5, 6, 7, 8, 9, 10, 11 or 12) C atoms or having, as in the case of $C_{1-6}$-alkyl, 1 to 6 (i.e., 1, 2, 3, 4, 5 or 6) C atoms. Where one or more of the substituents are an alkyl radical or include an alkyl radical which is monosubstituted or polysubstituted, it may be substituted preferably by, where appropriate, 1, 2, 3, 4 or 5, more preferably by 1, 2 or 3, substituents selected independently of one another from the group consisting of F, Cl, Br, I, —$NO_2$, —CN, —OH, —SH, —$NH_2$, —N($C_{1-5}$-alkyl)$_2$, —C(=O)—$C_{1-5}$-alkyl, —C(=O)-phenyl, —C(=O)—OH, —C(=O)—O—$C_{1-5}$-alkyl, —C(=O)—$NH_2$, —C(=O)—NH—$C_{1-5}$-alkyl and —C(=O)—N($C_{1-5}$-alkyl)$_2$, it being possible for the aforementioned $C_{1-5}$-alkyl radicals each to be linear or branched and for the abovementioned phenyl radicals to be substituted preferably by 1, 2, 3, 4 or 5 substituents selected independently of one another from the group consisting of F, Cl, Br, I, —CN, —$CF_3$, methyl, ethyl, n-propyl, isopropyl, n-butyl, 2-butyl, isobutyl, and tert-butyl. Particularly preferred substituents may be selected independently of one another from the group consisting of F, Cl, Br, I, —$NO_2$ and —CN.

Examples of suitable $C_{1-12}$-alkyl radicals, which may be unsubstituted or monosubstituted or polysubstituted, include methyl, ethyl, n-propyl, isopropyl, n-butyl, isobutyl, 2-butyl, tert-butyl, n-pentyl, 2-pentyl, 3-pentyl, isopentyl, neopentyl, n-hexyl, 2-hexyl, 3-hexyl, n-heptyl, n-octyl, —C(H)($C_2H_5$)$_2$, —C(H)(n-$C_3H_7$)$_2$, and —$CH_2$—$CH_2$—C(H)($CH_3$)—($CH_2$)$_3$—$CH_3$.

Examples of suitable $C_{1-6}$ alkyl radicals include methyl, ethyl, n-propyl, isopropyl, n-butyl, isobutyl, 2-butyl, tert-butyl, n-pentyl, 2-pentyl, 3-pentyl, isopentyl, neopentyl, n-hexyl, 2-hexyl, and 3-hexyl.

By polysubstituted alkyl radicals are meant those alkyl radicals which are substituted two or more times either on different C atoms or on identical C atoms, preferably two or three times, for example, three times on the same C atom as in the case of —$CF_3$, or at different locations as in the case of —(CHCl)—($CH_2F$). The polysubstitution may be with the same substituent or with different substituents. Examples of suitable substituted alkyl radicals include —$CF_3$, —$CF_2H$, —$CFH_2$, —($CH_2$)—CN, —($CH_2$)—($CF_3$), —($CH_2$)—($CHF_2$), —($CH_2$)—($CH_2F$), —($CH_2$)—($CH_2$)—CN, —($CF_2$)—($CF_3$), and —($CH_2$)—($CH_2$)—($CF_3$).

The term "alkenyl" for the purposes of the present invention encompasses acyclic unsaturated hydrocarbon radicals, which may be branched or straight-chain and also unsubstituted or at least monosubstituted, and have at least one double bond, preferably 1, 2 or 3 double bonds, having, as in the case of $C_{2-12}$-alkenyl, 2 to 12 (i.e., 2, 3, 4, 5, 6, 7, 8, 9, 10, 11 or 12) C atoms or having, as in the case of $C_{2-6}$-alkenyl, 2 to 6 (i.e., 2, 3, 4, 5 or 6) C atoms. Where one or more of the substituents are an alkenyl radical or contain an alkenyl radical which is monosubstituted or polysubstituted, it can be substituted preferably by, where appropriate, 1, 2, 3, 4 or 5, more preferably 1, 2 or 3, substituents selected independently of one another from the group consisting of F, Cl, Br, I, —$NO_2$, —CN, —OH, —SH, —$NH_2$, —N($C_{1-5}$-alkyl)$_2$, C(=O)—$C_{1-5}$-alkyl, —C(=O)-phenyl, —C(=O)—OH, —C(=O)—O—$C_{1-5}$-alkyl, —C(=O)—$NH_2$, —C(=O)—NH—$C_{1-5}$-alkyl, and —C(=O)—N($C_{1-5}$-alkyl)$_2$, it being possible for the aforementioned $C_{1-5}$-alkyl radicals each to be linear or branched and for the aforementioned phenyl radicals to be substituted preferably by 1, 2, 3, 4 or 5 substituents selected independently of one another from the group consisting of F, Cl, Br, I, —CN, —$CF_3$, methyl, ethyl, n-propyl, isopropyl, n-butyl, 2-butyl, isobutyl, and tert-butyl. Particularly preferred substituents may be selected independently of one another from the group consisting of F, Cl, Br, I, —$NO_2$, and —CN.

Examples of suitable $C_{2-12}$-alkenyl radicals include ethenyl, 1-propenyl, 2-propenyl, 1-butenyl, 2-butenyl, 3-butenyl, 1-pentenyl, 2-pentenyl, 3-pentenyl, 4-pentenyl, hexenyl, —CH=CH—CH=CH—$CH_3$, and —$CH_2$—$CH_2$—CH=$CH_2$.

By polysubstituted alkenyl radicals are meant those alkenyl radicals which are substituted two or more times, preferably twice, either on different C atoms or on identical C atoms, for example, twice on the same C atom as in the case of —CH=$CCl_2$, or at different locations as in the case of —CCl=CH—($CH_2$)—Cl. The multiple substitution may be with the same substituent or by different substituents. Examples of suitable alkenyl radicals include —CH=CH—($CH_2$)—F, —CH=CH—($CH_2$)—Cl, and —CH=CH—CN.

The term "heteroalkyl" identifies an alkyl radical as described above in which one or more C atoms have each been replaced by a heteroatom selected independently of one another from the group consisting of oxygen, sulfur, and nitrogen (NH). Heteroalkyl radicals may have preferably 1, 2 or 3 heteroatoms selected independently of one another from the group consisting of oxygen, sulfur, and nitrogen (NH) as (a) chain member(s). With particular preference the heteroatom is an oxygen or sulfur atom. With very particular preference the heteroatom is an oxygen atom. Heteroalkyl radicals may be preferably 2- to 12-membered, more preferably 2- to 6-membered.

Examples of suitable heteroalkyl radicals, which may be unsubstituted or monosubstituted or polysubstituted, include —$CH_2$—O—$CH_3$, —$CH_2$—O—$C_2H_5$, —$CH_2$—O—CH($CH_3$)$_2$, —$CH_2$—O—C($CH_3$)$_3$, —$CH_2$—$CH_2$—O—$CH_3$, —CH$_2$—CH$_2$—O—C$_2$H$_5$, —CH$_2$—CH$_2$—O—CH(CH$_3$)$_2$, —CH$_2$—CH$_2$—O—C(CH$_3$)$_3$, —CH$_2$—S—CH$_2$—O—CH$_3$, —CH$_2$—O—CH$_2$—O—C$_2$H$_5$, —CH$_2$—O—CH$_2$—O—CH(CH$_3$)$_2$, —CH$_2$—S—CH$_2$—O—C(CH$_3$)$_3$, —CH$_2$—O—CH$_2$—S—CH$_3$, —CH$_2$—O—CH$_2$—S—C$_2$H$_5$, and —CH$_2$—O—CH$_2$—S—CH(CH$_3$)$_2$.

Examples of suitable substituted heteroalkyl radicals include —(CH$_2$)—O—(CF$_3$), —(CH$_2$)—O—(CHF$_2$), —(CH$_2$)—O—(CH$_2$F), —(CF$_2$)—O—(CF$_3$), and —(CH$_2$)—(CH$_2$)—(CH$_2$)—O—(CF$_3$).

The term "cycloalkyl" for the purposes of the present invention denotes a cyclic saturated hydrocarbon radical having preferably 3, 4, 5, 6, 7, 8 or 9 C atoms, more preferably having 3, 4, 5, 6 or 7 C atoms, very preferably having 5 or 6 C atoms, it being possible for the radical to be unsubstituted or monosubstituted or polysubstituted by identical or different substituents.

Examples of suitable C$_{3-9}$-cycloalkyl radicals, which may be unsubstituted or monosubstituted or polysubstituted, include cyclopropyl, cyclobutyl, cyclopentyl, cyclohexyl, cycloheptyl, cyclooctyl, and cyclononyl. Suitable C$_{3-7}$-cycloalkyl radicals include cyclopropyl, cyclobutyl, cyclopentyl, cyclohexyl, and cycloheptyl.

The term "heterocycloalkyl" for the purposes of the present invention denotes a cyclic saturated hydrocarbon radical having preferably 3, 4, 5, 6, 7, 8, or 9 C atoms, more preferably having 3, 4, 5, 6 or 7 C atoms, very preferably having 5 or 6 C atoms, in which one or more C atoms have been replaced in each case by a heteroatom selected independently of one another from the group consisting of oxygen, sulfur, and nitrogen (NH). Heterocycloalkyl radicals may have preferably 1, 2 or 3 heteroatoms selected independently of one another from the group consisting of oxygen, sulfur, and nitrogen (NH) as (a) ring member(s). With particular preference the heteroatom is an oxygen or sulfur atom. With very particular preference the heteroatom is an oxygen atom. A heterocycloalkyl radical may be unsubstituted or monosubstituted or polysubstituted by identical or different substituents. Heterocycloalkyl radicals may be preferably 3- to 9-membered, more preferably 3- to 7-membered, very preferably 5- to 7-membered.

Examples of suitable 3- to 9-membered heterocycloalkyl radicals, which may be unsubstituted or polysubstituted, include tetrahydrofuranyl, tetrahydrothiophenyl, tetrahydropyranyl, oxetanyl, 1,3-dioxolan-2-yl, isoxazolidinyl, oxazolidinyl, and 1,2,4-oxadiazolidinyl. Examples of suitable 5- to 7-membered heterocycloalkyl radicals include tetrahydrofuranyl, tetrahydrothiophenyl, tetrahydropyranyl, oxetanyl, and 1,3-dioxolan-2-yl.

The term "heterocycloalkenyl" for the purposes of the present invention denotes a cyclic unsaturated hydrocarbon radical having preferably 4, 5, 6, 7, 8 or 9 C atoms, more preferably having 4, 5, 6 or 7 C atoms, very preferably having 5 or 6 C atoms, which has at least one double bond, preferably one double bond, and in which one or more C atoms have been replaced in each case by a heteroatom selected independently of one another from the group consisting of oxygen, sulfur, and nitrogen (NH). Heterocycloalkenyl radicals may have preferably 1, 2 or 3 heteroatoms selected independently of one another from the group consisting of oxygen, sulfur, and nitrogen (NH) as (a) ring member(s). With particular preference the heteroatom is an oxygen or sulfur atom. With very particular preference the heteroatom is an oxygen atom. A heterocycloalkenyl radical may be unsubstituted or monosubstituted or polysubstituted by identical or different substituents. Heterocycloalkenyl radicals may be preferably 4- to 9-membered, more preferably 4- to 7-membered, very preferably 5- to 7-membered.

Examples of suitable heterocycloalkenyl radicals or suitable 5- to 7-membered heterocycloalkenyl radicals, which may be unsubstituted or monosubstituted or polysubstituted, include 2,3-dihydrofuranyl, 2,5-dihydrofuranyl, 2,3-dihydrothienyl, 2,5-dihydrothienyl, 2,3-dihydrooxazolyl, 4,5-dihydrooxazolyl, 2,5-dihydrooxazolyl, and dihydropyranyl.

Where one or more of the substituents is or are a cycloalkyl radical, heterocycloalkyl radical, cycloalkenyl radical or heterocycloalkenyl radical, or has or have such a radical, which is monosubstituted or polysubstituted, that radical can be substituted preferably by, where appropriate, 1, 2, 3, 4 or 5, more preferably by, where appropriate, 1, 2 or 3, substituents selected independently of one another from the group consisting of F, Cl, Br, I, —CN, —CF$_3$, —OH, —NH$_2$, —O—CF$_3$, —SH, —O—C$_{1-5}$-alkyl, —O-phenyl, —O—CH$_2$-phenyl, —(CH$_2$)—O—C$_{1-5}$-alkyl, —C$_{1-5}$-alkyl, —C$_{2-5}$-alkenyl, —C$_{2-5}$-alkynyl, —C(=O)—O—C$_{1-5}$-alkyl, —C(=O)—CF$_3$, oxo (=O), thioxo (=S), —N(C$_{1-5}$-alkyl)$_2$, —NO$_2$, —S—CF$_3$ and phenyl, it being possible for the aforementioned C$_{1-5}$-alkyl radicals in each case to be linear or branched and for the phenyl radicals in each case to be unsubstituted or substituted by 1, 2, 3, 4 or 5, preferably by 1, 2, 3 or 4, substituents selected independently of one another from the group consisting of F, Cl, Br, I, —CN, —CF$_3$, —OH, —NH$_2$, —O—CF$_3$, —SH, —O—C$_{1-5}$ alkyl, and —C$_{1-5}$-alkyl.

The term "aryl" for the purposes of the present invention denotes a monocyclic or polycyclic, preferably a monocyclic or bicyclic, aromatic hydrocarbon radical having preferably 6, 10 or 14 C atoms. An aryl radical may be unsubstituted or monosubstituted or polysubstituted by identical or different substituents. Examples of suitable aryl radicals include phenyl, 1-naphthyl, 2-naphthyl, and anthracenyl. With particular preference an aryl radical is a phenyl radical.

The term "arylene" for the purposes of the present invention denotes a monocyclic or bicyclic aromatic hydrocarbon radical having preferably 6 or 10 C atoms which is divalent, i.e., the radical possesses two open valences or bonding sites in the parent structure of the general formula I. An aryl radical may be unsubstituted or monosubstituted or polysubstituted by identical or different substituents. An arylene radical may be unsubstituted or monosubstituted or polysubstituted by identical or different substituents. A preferred arylene radical is phenylene.

The terms "-(alkylene)-(arylene)-" and "-(heteroalkylene)-(arylene)-" for the purposes of the present invention denote divalent hydrocarbon radicals in which one open valence is located on the alkyl or heteroalkyl radical and the other open valence on the aryl radical. An -(alkylene)-(arylene)- or -(heteroalkylene)-(arylene)- may be unsubstituted or monosubstituted or polysubstituted by identical or different substituents.

Examples of suitable -(alkylene)-(arylene)- radicals, which may be unsubstituted or monosubstituted or polysubstituted, include, for example, —(CH$_2$)-phenylene and —(CH$_2$)—(CH$_2$)-phenylene.

Where one or more of the substituents is or are an aryl, arylene, -(alkylene)-(arylene)- or -(heteroalkylene)-(arylene)- or has or have an aryl, arylene, -(alkylene)-(arylene)- or -(heteroalkylene)-(arylene)- which is monosubstituted or polysubstituted, that unit may be substituted preferably by, where appropriate, 1, 2, 3, 4 or 5, more preferably by, where appropriate, 1, 2 or 3, substituents selected independently of one another from the group consisting of F, Cl, Br, I, —CN, —NO$_2$, —OH, —SH, —NH$_2$, —C(=O)—

OH, —C$_{1-5}$-alkyl, —(CH$_2$)—O—C$_{1-5}$-alkyl, —C$_{2-5}$-alkenyl, —O—C$_{1-5}$-alkyl, —O-phenyl, —O—CH$_2$-phenyl, —CF$_3$, —CHF$_2$, —CH$_2$F, —O—CF$_3$, —O—CHF$_2$, —O—CH$_2$F, and —C(=O)—C$_{1-5}$-alkyl, it being possible for the aforementioned C$_{1-5}$-alkyl radicals in each case to be linear or branched and for the cyclic substituents or the cyclic radicals of these substituents themselves to be substituted by, where appropriate, 1, 2, 3, 4 or 5, preferably by, where appropriate, 1, 2, 3 or 4, substituents selected independently of one another from the group consisting of F, Cl, Br, I, —CN, —NO$_2$, —OH, —SH, —NH$_2$, —C$_{1-5}$-alkyl, —O—C$_{1-5}$-alkyl, —CF$_3$, —CHF$_2$, —CH$_2$F, —O—CF$_3$, —O—CHF$_2$—, and —O—CH$_2$F.

With particular preference the substituents may be selected in each case independently of one another from the group consisting of F, Cl, Br, I, —CN, —NO$_2$, methyl, ethyl, n-propyl, isopropyl, n-butyl, isobutyl, 2-butyl, tert-butyl, —O—CH$_3$, —O—C$_2$H$_5$, —O—C$_3$H$_7$, —O—C(CH$_3$)$_3$, —CF$_3$, —CHF$_2$, and —CH$_2$F.

The term "alkylene" for the purposes of the present invention encompasses divalent acyclic saturated hydrocarbon chains which join hydrocarbon radical to compound of the general formula I or to another substituent. Alkylene chains may be branched or straight-chain and also unsubstituted or at least monosubstituted, with, as in the case of C$_{1-12}$-alkylene, 1 to 12 (i.e., 1, 2, 3, 4, 5, 6, 7, 8, 9, 10, 11 or 12) C atoms, with, as in the case of C$_{1-6}$-alkylene, 1 to 6 (i.e., 1, 2, 3, 4, 5 or 6) C atoms, or with, as in the case of C$_{1-3}$-alkylene, 1 to 3 (i.e., 1, 2 or 3) C atoms. Examples include C$_{1-5}$-alkylene groups such as —(CH$_2$)—, —(CH$_2$)$_2$—, —C(H)(CH$_3$)—, —(CH$_2$)$_3$—, —(CH$_2$)$_4$—, —(CH$_2$)$_5$—, —C(CH$_3$)$_2$—, —C(H)(CH$_3$)—, —C(H)(C(H)(CH$_3$)$_2$)—, and C(C$_2$H$_5$)(H)—.

The term "alkenylene" for the purposes of the present invention encompasses acyclic unsaturated hydrocarbon chains which join hydrocarbon radical to compound of the general formula I or to another substituent.

Alkenylene chains have at least one double bond, preferably 1, 2 or 3 double bonds, and may be branched or straight-chain and also unsubstituted or at least monosubstituted, having, as in the case of C$_{2-12}$-alkenylene, 2 to 12 (i.e., 2, 3, 4, 5, 6, 7, 8, 9, 10, 11 or 12) C atoms, having, as in the case of C$_{2-6}$-alkenylene, 2 to 6 (i.e., 2, 3, 4, 5 or 6) C atoms, or having, as in the case of C$_{2-3}$-alkenylene 2 to 3 (i.e., 2 or 3) C atoms. Examples include C$_{2-3}$-alkenylene groups such as —CH=CH— and —CH$_2$—CH=CH—.

The term "heteroalkylene" identifies an alkylene chain as described above in which one or more C atoms have been replaced in each case by a heteroatom selected independently of one another from the group consisting of oxygen, sulfur, and nitrogen (NH). Heteroalkylene groups may have preferably 1, 2 or 3 heteroatoms, more preferably one heteroatom, selected from the group consisting of oxygen, sulfur, and nitrogen (NH), as (a) chain member(s). With particular preference the heteroatom is an oxygen or sulfur atom. With very particular preference the heteroatom is an oxygen atom. Heteroalkylene groups may be preferably 2- to 12-membered, more preferably 2- to 6-membered, very preferably 2- or 3-membered.

Where one or more of the substituents is or are an alkylene, alkenylene or heteroalkylene group or has or have such a group which is monosubstituted or polysubstituted, that group may be substituted preferably by, where appropriate, 1, 2, 3, 4 or 5, more preferably by, where appropriate, 1, 2 or 3, substituents selected independently of one another from the group consisting of F, Cl, Br, I, —NO$_2$—, and —CN.

In the coating composition there are preferably 12% to 20% by weight of polyisocyanate and 8% to 18% by weight of polyol and 8% to 25% of ketimine or aldimines or mixtures thereof.

Preferably the coating composition of the invention contains 30% to 60% by weight, preferably 40% to 60% by weight, of one or more fillers, color pigments, and anticorrosion pigments.

The filler or the anticorrosion pigmentation preferably does not contain chromate.

Preferably the coating composition of the invention comprises calcium hydrogen phosphate in a mass fraction of 1% to 10% by weight, more preferably 1%-5% by weight.

Preferably the coating composition of the invention contains 0.1% to 3% by weight of at least one silane compound of the general formula (I).

Preference is given to silane compounds of the general formula (I) in which $R^1$ is H; an alkyl radical selected from the group consisting of methyl, ethyl, n-propyl, isopropyl, n-butyl, 2-butyl, isobutyl, tert-butyl, n-pentyl, and n-hexyl which is unsubstituted or substituted with, where appropriate, 1, 2, 3, 4 or 5 substituents selected independently of one another from the group consisting of F, Cl, Br, I, —NO$_2$, and —CN; or is a phenyl or benzyl radical which is unsubstituted or substituted by 1, 2, 3, 4 or 5 substituents selected independently of one another from the group consisting of F, Cl, Br, I, —CN, —NO$_2$, methyl, ethyl, n-propyl, isopropyl, n-butyl, isobutyl, 2-butyl, tert-butyl, —O—CH$_3$, —O—C$_2$H$_5$, —O—C$_3$H$_7$, —O—C(CH$_3$)$_3$, —CF$_3$, —CHF$_2$, and —CH$_2$F;

$R^2$ is a C$_{1-5}$-alkenylene radical which is unsubstituted or substituted, where appropriate, by 1, 2 or 3 substituents selected independently of one another from the group consisting of F, Cl, Br, I, —NO$_2$, and —CN;

$R^3$ is —O—R$^6$; —C(=O)—R$^7$; H; an alkyl radical selected from the group consisting of methyl, ethyl, n-propyl, isopropyl, n-butyl, 2-butyl, isobutyl, tert-butyl, n-pentyl, and n-hexyl which is unsubstituted or substituted by, where appropriate, 1, 2, 3, 4 or 5 substituents selected independently of one another from the group consisting of F, Cl, Br, I, —NO$_2$, and —CN;

$R^4$ is —O—R$^8$; —C(=O)—R$^9$; H; an alkyl radical selected from the group consisting of methyl, ethyl, n-propyl, isopropyl, n-butyl, 2-butyl, isobutyl, tert-butyl, n-pentyl, and n-hexyl which is unsubstituted or substituted by, where appropriate, 1, 2, 3, 4 or 5 substituents selected independently of one another from the group consisting of F, Cl, Br, I, —NO$_2$, and —CN;

$R^5$ is —O—R$^{10}$; —C(=O)—R$^{11}$; H; an alkyl radical selected from the group consisting of methyl, ethyl, n-propyl, isopropyl, n-butyl, 2-butyl, isobutyl, tert-butyl, n-pentyl, and n-hexyl which is unsubstituted or substituted by, where appropriate, 1, 2, 3, 4 or 5 substituents selected independently of one another from the group consisting of F, Cl, Br, I, —NO$_2$, and —CN; and $R^6$, $R^7$, $R^8$, $R^9$, $R^{10}$, and $R^{11}$, independently of one another, in each case are H or are an alkyl radical selected from the group consisting of methyl, ethyl, n-propyl, isopropyl, n-butyl, 2-butyl, isobutyl, tert-butyl, n-pentyl and n-hexyl which is unsubstituted or substituted by, where appropriate, 1, 2, 3, 4 or 5 substituents selected independently of one another from the group consisting of F, Cl, Br, I, —NO$_2$, and —CN.

Particular preference is given to silane compounds of the general formula (I) in which $R^1$ is H; an alkyl radical selected from the group consisting of methyl, ethyl, n-propyl, isopropyl, n-butyl, 2-butyl, isobutyl, tert-butyl, n-pentyl, and n-hexyl which is unsubstituted; or is a phenyl radical which is unsubstituted or substituted by 1, 2, 3, 4 or 5 substituents selected independently of one another from the group consisting of F, Cl, Br, and methyl;

$R^2$ is —$(CH_2)$—, —$(CH_2)_2$—, —$(CH_2)_3$—, —$(CH_2)_4$— or —$(CH_2)_5$—;

$R^3$ is —O—$R^6$ or H;

$R^4$ is —O—$R^8$ or H;

$R^5$ is —O—$R^{10}$ or H; and $R^6$, $R^8$ and $R^{10}$, independently of one another, in each case are H or are an alkyl radical selected from the group consisting of methyl, ethyl, n-propyl, isopropyl, n-butyl, 2-butyl, isobutyl, tert-butyl, n-pentyl, and n-hexyl which is unsubstituted.

Very particular preference is given to silane compounds of the general formula (I) in which $R^1$ is H; or is a phenyl radical which is unsubstituted or substituted by 1, 2, 3, 4 or 5 substituents selected independently of one another from the group consisting of F, Cl, Br, and methyl;

$R^2$ is —$(CH_2)_3$—;

$R^3$ is —O—$R^6$;

$R^4$ is —O—$R^8$;

$R^5$ is —O—$R^{10}$; and $R^6$, $R^8$ and $R^{10}$, independently of one another, in each case are a methyl or ethyl radical.

Even further preferred are silane compounds of the general formula (I) selected from the group consisting of 3-aminopropyltrimethoxysilane, available commercially, for example, as Geniosil GF 96 from Wackerchemie; 4-amino-3,3-dimethylbutyltrimethoxysilane, available commercially as Silquest A-1637 from Momentive; and N-phenyl-γ-aminopropyltrimethoxysilane, available commercially, for example, as Y-15085 (Silquest Y-9669) from Momentive.

The calcium hydrogen phosphate preferably has a particle size of 1.0 to 10.0 μm, more preferably 2.5-4.0 μm (measured with a Coulter Multisizer II). Using particles of this size results in particularly smooth surfaces.

The coating composition is preferably a combination of at least one isocyanate compound, at least one hydroxyl-containing compound, at least one ketimine, one or more fillers, color pigments, and anticorrosion pigments, one filler being calcium hydrogen phosphate, at least one solvent, and at least one silane of the aforementioned general formula I. The use of ketimines rather than aldimines leads to significantly better water spray outcomes, which may be found, for example, in better values of degree of blistering in the case of the use of ketimines.

With particular preference the coating composition contains 10% to 20% by weight of at least one isocyanate compound, 5% to 20% by weight of at least one hydroxyl -containing compound, 5% to 25% by weight of at least one ketimine, and 30% to 60% by weight of one or more fillers, color pigments, and anticorrosion pigments, calcium hydrogen phosphate in a mass fraction of 0.1% to 20% by weight being included as the filler or one filler, and at least one compound of the aforementioned formula (I) in a mass fraction of 0.1% to 5% by weight, based in each case on the total weight of the coating composition.

With very particular preference the coating composition contains 12% to 20% by weight of at least one isocyanate compound, 12% to 20% by weight of at least one hydroxyl-containing compound, 8% to 18% by weight of at least one ketimine, and 8% to 25% by weight of one or more fillers, color pigments, and anticorrosion pigments, calcium hydrogen phosphate in a mass fraction of 1% to 10% by weight being included as the filler or one filler, at least one solvent, and at least one compound of the aforementioned formula (I) in a mass fraction of 0.1% to 3% by weight, based in each case on the total weight of the coating composition.

The polyisocyanates which serve as parent structures for the isocyanate compounds used with preference in accordance with the invention are preferably conventional substituted or unsubstituted aromatic, aliphatic, cycloaliphatic and/or heterocyclic polyisocyanates.

The polyisocyanate or the isocyanate compound preferably has an average NCO functionality of 2 to 6.

Examples of preferred polyisocyanates are as follows: toluene 2,4-diisocyanate, toluene 2,6-diisocyanate, diphenylmethane 4,4'-diisocyanate, diphenylmethane 2,4'-diisocyanate, p-phenylene diisocyanate, biphenyl diisocyanates, 3,3'-dimethyldiphenyl 4,4'-diisocyanate, tetramethylene 1,4-diisocyanate, hexamethylene 1,6-diisocyanate, 2,2,4-trimethylhexane 1,6-diisocyanate, isophorone diisocyanate, ethylene diisocyanate, 1,12-dodecane diisocyanate, cyclobutane 1,3-diisocyanate, cyclohexane 1,3-diisocyanate, cyclohexane 1,4-diisocyanate, methylcyclohexyl diisocyanates, hexahydrotoluene 2,4-diisocyanate, hexahydrotoluene 2,6-diisocyanate, hexahydrophenylene 1,3-diisocyanate, hexahydrophenylene 1,4-diisocyanate, perhydrodiphenylmethane 2,4'-diisocyanate, methylenedicyclohexyl 4,4'-diisocyanate (e.g., Desmodur® W from Bayer AG), tetramethylxylyl diisocyanates (e.g., TMXDI® from American Cyanamid), and mixtures of the aforementioned polyisocyanates. Additionally preferred polyisocyanates are the polyisocyanates derived from a polyisocyanate by oligomerization, trimerization, dimerization, urethane formation, biuret formation or allophanate formation, or a mixture of these polyisocyanates. The last-mentioned polyisocyanates have a low viscosity.

Particularly preferred polyisocyanates are hexamethylene 1,6-diisocyanate, isophorone diisocyanate and methylenedicyclohexyl 4,4'-diisocyanate, their biuret dimers and/or isocyanurate trimers and/or allophanates and/or urethdiones, and mixtures of these parent compounds.

Very particularly preferred polyisocyanates are asymmetric trimers of hexamethylene 1,6-diisocyanate. These polyisocyanates are of particularly low viscosity.

As hydroxyl-containing compound it is preferred to use a low molecular mass polyol, an oligomeric polyol, a polymeric polyol or a mixture of these polyols.

The hydroxyl-containing compounds preferably have viscosities <4500 mPa·s at 23° C. as measured by DIN EN ISO 3219/A.3 and glass transition temperatures of <0° C. gas measured via DSC.

The hydroxyl number of the polyols is 5 to 350, preferably 8 to 200 mg KOH/g substance.

The hydroxyl number (OH number) indicates how many mg of potassium hydroxide are equivalent to the amount of acetic acid bound by 1 g of substance on acetylation. For the determination, the sample is boiled with acetic anhydride-pyridine and the resulting acid is titrated with potassium hydroxide solution (DIN 53240-2). The acid number in this context indicates the number of mg of potassium hydroxide consumed in neutralizing 1 g of the respective hydroxyl-containing compound (DIN EN ISO 2114).

Preferably, mass-average molecular weights Mw of polyols are situated between 650 and 20 000 daltons, with particular preference between 750 and 10 000 daltons, measured in each case by means of gel permeation chromatography (GPC) against a polystyrene standard.

The hydroxyl-containing compound is preferably a polyol having ether and/or ester groups. This polyol is preferably branched.

Raw materials otherwise suitable for preparing these polyester polyols, furthermore, are (e.g., Ullmanns Enzyklopädie der technischen Chemie, 4th edition, Volume 19, pp. 62-65) difunctional alcohols such as ethylene glycol, 1,2- and 1,3-propylene glycol, 1,3-, 1,4-, 2,3-butanediol, 1,6-hexanediol, neopentyl glycol, trimethylhexanediol, triethylene glycol, tetraethylene glycol, hydrogenated bisphenols, trimethylpentanediol, diethylene diglycol, dipropylene diglycol, 1,4-cyclohexanediol, 1,4-cyclohexanedimethanol, and difunctional carboxylic acids and/or their anhydrides, such as adipic acid, phthalic acid (anhydride), isophthalic acid, maleic acid (anhydride), terephthalic acid, tetrahydrophthalic acid (anhydride), hexahydrophthalic acid (anhydride), succinic acid (anhydride), fumaric acid, azelaic acid, dimer fatty acids. Polyester raw materials likewise suitable for concomitant use in minor amounts are monocarboxylic acids such as benzoic acid, 2-ethylhexanoic acid, oleic acid, soybean oil fatty acid, stearin fatty acid, peanut oil fatty acid, linseed oil fatty acid, nonanoic acid, cyclohexanemonocarboxylic acid, isononanoic acid, sorbic acid, Konjuene fatty acid, higher functional carboxylic acids or alcohols, such as trimellitic acid (anhydride), butanetetracarboxylic acid, trimer fatty acids, trimethylolpropane, glycerol, pentaerythritol, castor oil, dipentaerythritol, and other, unnamed polyester raw materials.

The weight fraction of the hydroxyl-containing fatty acid, based on the hydroxyl contents of the hydroxyl-containing compounds, is preferably more than 60%, more preferably more than 80%, and with particular preference more than 120%.

Likewise suitable are lactone-based polyesterdiols, which are homopolymers or copolymers of lactones, preferably hydroxyl-terminated adducts of lactones such as epsilon-caprolactone or gamma-butyrolactone, for example, with difunctional starter molecules. Suitable starter molecules may be the abovementioned diols, or alternatively low molecular mass polyesterdiols or polyetherdiols. Instead of the polymers of lactones it is also possible to use the corresponding hydroxycarboxylic acids.

Likewise suitable polyol components are polyetherpolyols. They are obtainable, for example, by polymerizing ethylene oxide, propylene oxide and/or tetrahydrofuran with themselves, in the presence of $BF_3$ or basic catalysts, for example, or else by addition reaction of these compounds, where appropriate in a mixture or in succession, with starter components containing reactive hydrogen atoms, such as alcohols, amines, amino alcohols or water.

Corresponding polyetherpolyols which can be used in the claimed invention are also described in Fett Wissenschaft Technologie/Fat Science Technology, 89, pages 147-151; J. Polym. Sci., Part B: Polym. Phys., 2003, 42, 809-819, and WO 97/0069363.

Preferred examples of commercial hydroxyl-containing compounds are Desmophen 1150, Sovermol 818, Sovermol 805, Sovermol 750, Caspol 5009, Caspol 1938, and Caspol 1842.

With particular preference the aldimine or ketimine used is the reaction product of the reaction of isophoronediamine with a corresponding aldehyde or ketone, respectively. The viscosity of these reaction products is low and they are therefore appropriate for use in the coating compositions of the invention.

In principle it is possible to prepare aldimines and ketimines as described in March, Advanced Organic Chemistry, Reactions, Mechanisms and Structure, Third edition, page 797, John Wiley & Sons. A further description is found in EP 0686654.

The coating compositions of the invention preferably comprise ≤540 g/l volatile organic compounds (VOC). With particular preference the coating compositions comprise ≤280 g/l VOC. On account of their low VOC content they cause only a small degree of environmental adversity.

Solvents suitable for the coating materials of the invention are more particularly those which in the coating material are chemically inert with respect to hydroxyl-containing compounds and isocyanato-containing compounds and which do not react with hydroxyl-containing compounds and isocyanato-containing compounds when the coating material is cured, either. Examples of such solvents are aliphatic and/or aromatic hydrocarbons such as toluene, xylene, solvent naphtha, Solvesso 100 or Hydrosol® (from ARAL), ketones, such as acetone, methyl ethyl ketone or methyl amyl ketone, esters, such as ethyl acetate, butyl acetate, pentyl acetate or ethyl ethoxypropionate, ethers or mixtures of the aforementioned solvents. A particularly preferred solvent is butyl acetate. The aprotic solvents or solvent mixtures preferably have a water content of not more than 1% by weight, more preferably not more than 0.5% by weight, based on the solvent.

The coating material of the invention may further comprise at least one typical and known coatings additive in effective amounts, i.e., in amounts preferably up to 30%, more preferably up to 25%, and very preferably up to 20%, by weight, based in each case on the total weight of the coating composition.

Examples of suitable coatings additives are:
more particularly UV absorbers;
more particularly light stabilizers such as HALS compounds, benzotriazoles or oxalanilides;
free-radical scavengers;
slip additives;
polymerization inhibitors;
defoamers;
reactive diluents of the kind that are general knowledge from the state of the art, and which are preferably inert with respect to the —Si(OR)$_3$ groups;
wetting agents such as siloxanes, fluorine compounds, carboxylic monoesters, phosphoric esters, polyacrylic acids and their copolymers or polyurethanes;
adhesion promoters such as tricyclodecanedimethanol;
flow control agents;
dispersants;
antisettling agents;
pigment stabilizers;
film-forming assistants such as cellulose derivatives;
fillers such as, for example, nanoparticles based on silicon dioxide, aluminum oxide or zirconium oxide; for further details refer to Römpp Lexikon "Lacke and Druckfarben", Georg Thieme Verlag, Stuttgart, 1998, pages 250 to 252;

fillers such as, for example, reinforcing fillers, such as fumed silica, precipitated silica, and calcium carbonate, for example;

fillers such as, for example, zinc phosphate;

rheology control additives such as the additives known from patents WO 94/22968, EP-A-0 276 501, EP-A-0 249 201 or WO 97/12945; crosslinked polymeric microparticles, of the kind disclosed, for example, in EP-A-0 008 127; inorganic phyllosilicates such as aluminum magnesium silicates, sodium magnesium phyllosilicates and sodium magnesium fluorine lithium phyllosilicates of the montmorillonite type; silicas such as Aerosils; or synthetic polymers with ionic and/or associative groups such as polyvinyl alcohol, poly(meth) acrylamide, poly(meth)acrylic acid, polyvinylpyrrolidone, styrene-maleic anhydride copolymer or ethylene-maleic anhydride copolymer and derivatives thereof, or hydrophobically modified ethoxylated urethanes or polyacrylates;

and/or flame retardants.

Furthermore, the coating composition of the invention may comprise color pigments and anticorrosion pigments. The pigments used for these purposes are known to the skilled worker. Examples of color pigments are white pigments such as titanium dioxide, zinc oxide, zinc sulfide, lithopones, and barium sulfate, and black pigments such as carbon black, inorganic spinels and organic black pigments. Likewise examples of color pigments are chromatic pigments such as inorganic chromatic pigments (iron oxide, lead molybdate, bismuth vanadate, ferrocyanide blue, ultramarine) and organic chromatic pigments (azo pigments, metal core pigments, triphenylmethane pigments, indigoid pigments, isoindolines, isoindolinones, anthraquinones, quinacridones, and perylene).

The invention also provides a process for preparing a composition of the invention by mixing a composition comprising the at least one hydroxyl-containing compound with a composition comprising at least one isocyanato-containing compound. With further preference, in the course of this mixing operation, a further composition is admixed that comprises the at least one aldimine and/or ketimine. The composition comprising the at least one hydroxyl-containing compound preferably also comprises the additive or additives. In the course of this mixing operation at least one silane compound of the general formula (I) is admixed.

The silane component of the formula (I) is added preferably to the component containing filler and pigment or to the component containing reactive diluent. This is preferably done while the coating material is being made up with stirring or in a multi component mixing unit.

Mixing takes place preferably at temperatures between 10 and 30° C., more preferably at temperatures between 15 and 25° C.

The invention further provides for the use of the coating compositions of the invention as coating material in the automotive refinish segment, in the vehicle, utility-vehicle (including skips, chassis), agricultural-machinery and rail segments. The coating compositions of the invention are used preferably as primers, with and without chemical pretreatment such as iron or zinc phosphating, and with and without mechanical pretreatment such as sandblasting, abrading or the like. The coating compositions of the invention may in these cases be used either as a primer beneath a basecoat and a clearcoat film or beneath a single-coat topcoat. Preference extends to the use of the coating compositions of the invention as primers on aluminum, steel, plastics, and multimaterial substrates, i.e., substrates composed of different materials. Examples of multimaterial substrates are, more particularly in the automotive refinish segment, existing paint finishes with areas where the coating has been abraded right through. At such areas, undefined metallic substrates meet undefined polymeric substrates (an existing paint finish composed, for example, of electrocoat, primer, basecoat, and clearcoat). Particular preference is given to use on aluminum or a multimaterial substrate.

The invention likewise provides a coated substrate producible by coating a substrate with a coating composition of the invention and curing the coating. This coated substrate is preferably coated with the coating composition as a primer beneath a basecoat film and a clearcoat film or beneath a single-coat topcoat. The substrate is preferably aluminum, steel or plastic or a multimaterial substrate. With particular preference the substrate is aluminum or a multimaterial substrate.

The invention is illustrated below with reference to examples.

EXAMPLES

The following three compositions are prepared, with the figures stated for the quantities:

| | | |
|---|---|---|
| 1. | 237.3 g | branched polyalcohol with ether and ester groups (Desmophen ® 1150) |
| | 46.0 g | calcium hydrogen phosphate, particle size 2.5- 4.0 µm (Heucophos ® CHP) |
| | 229.6 g | zinc phosphate (Heucophos ® ZPA) |
| | 205.3 g | butyl acetate 98-100% |
| | 15.3 g | Disperbyk 111 |
| | 6.1 g | Bentone 38 |
| | 6.1 g | Aerosil R 972 |
| | 4.6 g | Bayferrox 3910 |
| | 1.5 | Flammenruβ 101 lamp black |
| | 91.9 g | Luzenac 10 MO |
| | 61.2 g | Silitin N 85 |
| | 206.7 g | Blanc Fixe N |
| | 290.9 g | Titan Rutil Tiona 595 rutile $TiO_2$ |
| | 91.9 g | Zeeospheres G 600 |
| 2. | 1200 g | ketimine (Desmophen ® 2965) |
| | 291 g | butyl acetate 98-100% |
| | 9.0 g | benzoic acid D |
| 3. | 1275 g | asymmetric HMDI trimer (Desmodur ® XP 2410) |
| | 225 g | butyl acetate 98-100% |

A coating material is prepared from components 1, 2, and 3 by mixing 200 g of component 1, 47.4 g of component 3, and 60.1 g of component 2, and 2.1 g of one of silanes 1 to 5 is added to the coating material. For this the silane is preferably added to component 1 prior to making-up.

| | | |
|---|---|---|
| Inventive example 1: silane 1 | Geniosil GF 96 ® | 3-aminopropyl-trimethoxysilane |
| Inventive example 2: silane 2 | Silquest Y-9669 ® | N-phenyl-γ-aminopropyl-trimethoxysilane |
| Comparative example 3: silane 3 | Geniosil GF 80 ® | 3-glycidyloxy-propyl-trimethoxysilane |
| Comparative example 4: silane 4 | A-Link 597 ® | (tris(3-(trimethoxy-silyl)propyl) isocyanurate |
| Comparative example 5: silane 5 | | vinyltrimethoxysilane |

The resulting coating composition is applied as a primer-surfacer to steel (CRS panels for bodywork panel 18 from Meier & Co.) and aluminum (AlMgSi AA6016, degreased, from Chemetall) and the applied coating is a) only dried or b) flashed off at room temperature for 30 minutes. This is followed by overcoating with a standard topcoat (e.g., solvent-borne 2-component high-solids coating material of series GM40, which is dried at 60° C. over a period of 30 minutes, or waterborne 2-component coating material of series GW32 from BASF Coatings AG, which is flashed off at room temperature for 30 minutes and then dried at 60° C. over a period of 60 minutes).

Tests:
The cross-cut test takes place in accordance with DIN ISO 2409.
Salt Spray Fog Test SS
Specification: DIN 50 021-SS
Test instrument: Corrosion test instruments as per DIN 50 021:
  SL 2000 and SL 2000 from Liebisch
  VSNK 1500 S from Heraeus-Vötsch
Test chamber temperature: 35±2° C. continuously
Test cycle: Spraying of aqueous NaCl solution
Test parameters: NaCl concentration of precipitation=50±5 g/l
  pH of precipitation=6.5–7.2 (at 23±2° C.)
  precipitation volume=1.5±0.5 ml/h*80 cm$^2$
Test duration: 24 h/day
Salt Spray Fog Test ESS
Specification: DIN 50 021-ESS
Test instrument: Corrosion test instruments as per DIN 50 021:
  SL 2000 and SL 2000 from Liebisch
Test chamber temperature: 35±2° C. continuously
Test cycle: Spraying of aqueous NaCl solution, acidified with acetic acid
Test parameters: NaCl concentration of precipitation=50±5 g/l
  pH of precipitation=3.1–3.3 (at 23±2° C.)
  precipitation volume=1.5±0.5 ml/h*80 cm$^2$
Test duration: 24 h/day
Scratch sample:
Relative scale of 1-10, 1=worst, 10=best
Topcoat holdout
Relative scale of 1-10, 1=worst, 10=best
Test Results:

| | GT cut test | Salt spray test | ESS test |
|---|---|---|---|
| Inventive example 1 | GT 0 on steel and aluminum | corrosion resistance good, scribe creep <3.5 mm after 1 h regeneration | corrosion resistance very good, scribe creep <1 mm after 1 h regeneration |
| Inventive example 2 | GT 0 on steel and aluminum | corrosion resistance good, scribe creep <3.5 mm after 1 h regeneration | corrosion resistance good, scribe creep <4 mm after 1 h regeneration |
| Comparative example 3 | GT 5, delamination on aluminum GT 0-1 on steel | — | — |
| Comparative example 4 | GT 5, delamination on aluminum GT 1-2 on steel | — | — |
| Comparative example 5 | GT 5, delamination on aluminum GT 0-1 on steel | — | — |

What is claimed is:

1. A coating composition comprising, based on the total weight of the coating composition:
   12% to 20% by weight of at least one isocyanate compound that is hexamethylene 1,6-diisocyanate and its biuret dimer and/or isocyanurate trimer,
   12% to 20% by weight of at least one hydroxyl-containing compound that is a polyol having ester and/or ether groups,
   5% to 25% by weight of a ketimine,
   40% to 60% by weight of one or more members selected from the group consisting of chromate-free fillers, color pigments and anticorrosion pigments, wherein 1% to 5% by weight calcium hydrogen phosphate is present in the coating composition, as the filler or as a filler,
   at least one solvent that is butyl acetate, and
   0.1% to 3.0% by weight of at least one silane compound selected from the group consisting of 3-aminopropyl-trimethoxysilane, and N-phenyl-γ-aminopropyl-tri-methoxy silane,
   the mass fractions of the stated constituents adding, together with the solvent, to 100% by weight.

2. The coating composition of claim 1, wherein the calcium hydrogen phosphate has an average particle size of 1.0 to 10.0 μm.

3. The coating composition of claim 1, comprising ≤540 g/l, of volatile organic compounds.

4. A process for preparing the coating composition of claim 1, comprising mixing a composition comprising the at least one hydroxyl-containing compound with a composition comprising the at least one isocyanate compound.

5. The process of claim 4, wherein the mixing is accompanied by the admixing of a further composition comprising the at least one of ketamine.

6. The process of claim 4, wherein the mixing is accompanied by the admixing of the at least one silane compound.

7. A method of coating a substrate comprising applying the coating composition of claim 1, to a substrate that is used in at least one of the automotive refinish industry, vehicle manufacturing segment, utility-vehicle manufacturing segment or agricultural-machinery manufacturing segment.

8. The method of claim 7 wherein the substrate is at least one of aluminum, steel, plastic or multimaterial substrates, and the coating composition is a primer.

9. The coating composition of claim 1, wherein the coating composition does not exhibit delamination under GT crosscut test DIN ISO 2409.

\* \* \* \* \*